United States Patent Office 2,830,013
Patented Apr. 8, 1958

2,830,013

CATALYTIC DESULPHURISATION OF PETROLEUM HYDROCARBONS

Roy Purdy Northcott and Ernest Carlton Housam, Sunbury-on-Thames, England, assignors to The British Petroleum Company Limited, London, England, a British joint-stock corporation No Drawing. Application February 27, 1956
Serial No. 567,749

Claims priority, application Great Britain March 4, 1955

6 Claims. (Cl. 196—28)

This invention relates to the catalytic desulphurisation of petroleum hydrocarbons by means of the autofining process, the nature of which is fully described inter alia in United States Patents Nos. 2,573,726, 2,574,445–51 and 2,640,802.

The catalyst normally employed in the operation of the autofining process is of the kind comprising the oxides of cobalt and molybdenum either as such or in combined form incorporated with a metal oxide support, usually alumina. It has been shown that the effectiveness of the desulphurisation obtained by the autofining process may be considerably increased by the incorporation of a small amount of fluorine into the catalyst as described in copending application Ser. No. 311,429, filed September 25, 1952, now U. S. Patent No. 2,800,429. The use of fluorine-promoted catalysts enables a considerably greater degree of desulphurisation to be obtained over a given time by operating under the equilibrium pressure method described in United States Patent No. 2,648,623.

It has now been found that the effectiveness of the autofining process using a fixed bed of catalyst, particularly with regard to the length of time for which it is possible to operate before the sulphur content of the products exceeds a given maximum, is to some extent dependent upon the particle size of the catalyst, and that improved results may be obtained by using a catalyst having a particle size less than hitherto.

According to the present invention, an autofining process using a fixed bed of catalyst is carried out using a catalyst of the kind described which has a particle size not exceeding $7/32''$.

The expression "particle size" shall be taken to mean in the case of a catalyst in the form of pellets that the maximum dimension of the pellets does not exceed a given value, and in the case of a granular catalyst that the average particle diameter does not exceed a given value.

The invention is particularly applicable to the autofining of petroleum distillates boiling above the kerosine boiling range, such as distillates boiling within the gas oil boiling range.

The use of a catalyst in accordance with the present invention is particularly advantageous when operating under the equilibrium pressure method using a fluorine-promoted catalyst. The fluorine content of the catalyst is advantageously maintained between 2.5% and 6.0% by weight.

The invention will now be described with reference to the following experiments:

Four catalysts, differing only in particle size, were prepared from a single batch of gel (alumina gel activated with aluminum fluoride to which salts of molybdenum and cobalt were added). The catalysts had the following analysis:

$MoO_3$ ———— 16.4% wt. with material stable at 1020° F.
$CoO$ ———— 3.05% wt. with material stable at 1020° F.
Fluorine ———— 4.22% wt. with material stable at 1020° F.

and were prepared in the following sizes:

$5/16 \times 5/16$ inch pellets
$7/32 \times 7/32$ inch pellets
$5/32 \times 5/32$ inch pellets
4–8 mesh granular (average particle diameter 0.11 inch)

An autofining run was carried out over each catalyst using the following conditions:

Feedstock ———— Kuwait gas oil containing 1.29% wt. sulphur.
Temperature ———— 780° F.
Pressure ———— Equilibrium starting at 100 p. s. i. ga.
Space velocity ———— 2.0 v./v./hr.
Recycle rate ———— 2000 s. c. f./b. set at 100 p. s. i. ga.

The hours on stream to give a bulked product containing 0.1% wt. sulphur varied with catalyst particle size as follows:

| Catalyst size, inches | Hours on stream to give a bulked product of 0.1% wt. sulphur |
|---|---|
| $5/16 \times 5/16$ | 58 |
| $7/32 \times 7/32$ | 102 |
| Granular 0.11 average diameter | 110 |
| $5/32 \times 5/32$ | 128 |

We claim:

1. In the operation of the autofining process for the desulphurisation of petroleum hydrocarbons, using a fixed bed of catalyst comprising the oxides of cobalt and molybdenum incorporated with a support consisting essentially of alumina, the improvement which comprises using a catalyst having a particle size not exceeding $7/32''$.

2. An autofining process according to claim 1, which is carried out under equilibrium pressure.

3. An autofining process according to claim 1, wherein the catalyst contains a small amount of fluorine.

4. An autofining process according to claim 3, wherein the fluorine content of the catalyst is maintained between 2.5% and 6.0% by wt.

5. An autofining process according to claim 2, wherein the petroleum hydrocarbons boil above the kerosine boiling range.

6. An autofining process according to claim 5, wherein the petroleum hydrocarbons boil within the gas oil boiling range.

References Cited in the file of this patent

UNITED STATES PATENTS

| 1,984,380 | Odell | Dec. 18, 1934 |
| 2,648,623 | Porter et al. | Aug. 11, 1953 |
| 2,718,490 | Porter | Sept. 20, 1955 |
| 2,760,907 | Attane et al. | Aug. 28, 1956 |

FOREIGN PATENTS

| 706,842 | Great Britain | Apr. 7, 1954 |

UNITED STATES PATENT OFFICE

CERTIFICATE OF CORRECTION

Patent No. 2,830,013                  April 8, 1958

Roy Purdy Northcott et al.

It is hereby certified that error appears in the printed specification of the above numbered patent requiring correction and that the said Letters Patent should read as corrected below.

Column 2, lines 5, 6 and 7, for "with", each occurrence, read -- on --.

Signed and sealed this 23rd day of August 1960.

(SEAL)
Attest:
KARL H. AXLINE
Attesting Officer

ROBERT C. WATSON
Commissioner of Patents